(12) United States Patent
Shen et al.

(10) Patent No.: US 8,771,585 B2
(45) Date of Patent: Jul. 8, 2014

(54) METHOD FOR MANUFACTURING CERAMIC COMPONENTS

(75) Inventors: Zhijian Shen, Solna (SE); Saeid Esmaeilzadeh, Stockholm (SE); Katarina Flodstrom, Stockholm (SE); Charlotte Vieillard, Woerden (NL)

(73) Assignee: AB SKF, Gothenburg (SE)

( * ) Notice: Subject to any disclaimer, the term of this patent is extended or adjusted under 35 U.S.C. 154(b) by 630 days.

(21) Appl. No.: 13/060,099

(22) PCT Filed: Aug. 29, 2008

(86) PCT No.: PCT/EP2008/061411
§ 371 (c)(1),
(2), (4) Date: Jun. 27, 2011

(87) PCT Pub. No.: WO2010/022789
PCT Pub. Date: Mar. 4, 2010

(65) Prior Publication Data
US 2011/0260368 A1    Oct. 27, 2011

(51) Int. Cl.
*C04B 35/584* (2006.01)
*C04B 35/597* (2006.01)

(52) U.S. Cl.
USPC ........................................................ 264/683

(58) Field of Classification Search
USPC ........................................................ 264/683
See application file for complete search history.

(56) References Cited

U.S. PATENT DOCUMENTS

| | | | |
|---|---|---|---|
| 5,622,905 A | 4/1997 | Matsuura et al. | |
| 6,242,374 B1 * | 6/2001 | Komatsu | 501/97.2 |
| 2011/0266719 A1 * | 11/2011 | Shen et al. | 264/430 |
| 2013/0197659 A1 * | 8/2013 | Brandt et al. | 623/23.39 |

FOREIGN PATENT DOCUMENTS

| | | |
|---|---|---|
| JP | 2005-330178 | 12/2005 |
| WO | 2010/022788 | 3/2010 |

OTHER PUBLICATIONS

Nishimura, et al. "Fabrication of Silicon Nitride Nano-Ceramics by Spark Plasma Sintering", J. of Materials Sci Letters, Aug. 1995, vol. 14, Issue 15, pp. 1046-1047.*
Shen, Zhijian, et al., Conversion from Nano- to Micron-Sized Structures: Experimental Observations, Journal of the European Ceramic Society, vol. 24, pp. 3447-3452, Dec. 31, 2004, Stockholm, Sweden.
Shen, Zhijian, et al., "Formidable Increase in the Superplasticity of Ceramics in the Presence of an Electric Field", Advanced Materials, Jun. 16, 2033, vol. 15, Issue 12, pp. 1006-1009.
Lu, Xin, et al., "Study on Thermal Conductivity of SPS-Sintered Si3N4 Ceramics after Heat-Treatment", Materials Science Forum, Jan. 2005, vols. 475-479, 1279-1282.

(Continued)

*Primary Examiner* — Matthew Daniels
*Assistant Examiner* — Russell Kemmerle, III
(74) *Attorney, Agent, or Firm* — Bryan G. Pratt; Holland & Hart LLP

(57) ABSTRACT

The invention concerns a method for manufacturing a ceramic material with pseudo-isotropic microstructure. The method for tailoring the microstructure for manufacturing of sintered ceramic components involves a spark plasma sintering (SPS) process. By performing the SPS process in at least two steps it is possible to separate densification from grain growth. An initial sintering step at a first temperature and a first pressure, followed by a controlled grain growth step at a higher temperature and lower pressure makes it possible to manufacture ceramic components with controlled microstructure and improved mechanical properties.

13 Claims, 1 Drawing Sheet

(56) References Cited

OTHER PUBLICATIONS

Shen Z. et al. "Formidable Increase in the Superplasticity of Ceramics in the Presence of an Electric Field" Advanced Materials 20030617 Wiley-VCH Verlag DE, vol. 15, No. 12, Jun. 17, 2003, pp. 1006-1009, XP002529289.

Xin Lu et al. "Study on Thermal Conductivity of SPS-sintered Si3N4 Ceramics after Heat-treatment" PRICM-5: The Fifth Pacific Rim International Conference on Advanced Materials and Processing; Nov. 2-5, 2004, Beijing, China, Trans Tech Publ, Uetikon-Zurich, vol. 475-479, Jan. 1, 2005, pp. 1279-1282, XP008106480 ISBN: 978-0-87849-960-1 [retrieved on Jan. 15, 2005].

Shen Z., et al, "Conversion from nano- to micron-sized structures: experimental observations" Journal of the European Ceramic Society, Elsevier Science Publishers, Barking, Essex, GB, vol. 24, No. 12, Jan. 1, 2004 pp. 3447-3452, XP004504460 ISSN: 0955-2219.

Herrmann M., et al., "Silicon Nitride Materials with Low Friction Coefficients" Key Engineering Materials Trans Tech Publications Switzerland, vol. 161-163, 1999, pp. 599-602, XP008106476 ISSN: 1013-9826.

Sivakumar R., et al., "Thermal conductivity of combustion synthesized [beta]-sialons" Ceramics International May 2009 Elsevier Ltd.; Elsevier Advanced Technology; The Boulevard GB, vol. 35, No. 4, Aug. 5, 2008, pp. 1391-1395. XP002529291.

Bai et al., "Comparative study of beta-Si3N4 powders prepared by SHS sintered by spark plasma sintering and hot pressing" Journal of University of Science and Technology Beijing, Mineral, Metallurgy, Material, vol. 14, No. 3, Jun. 1, 2007, pp. 271-275, XP022934710 ISSN: 1005-8850 [retrieved on Jun. 1, 2007].

* cited by examiner

METHOD FOR MANUFACTURING CERAMIC COMPONENTS

FIELD OF THE INVENTION

The invention relates to a method for manufacturing ceramic components with a tailored microstructure through applying a sintering procedure in at least two steps, where a first step relates to the sintering and a second step involves a controlled grain growth in three dimensions.

BACKGROUND OF THE INVENTION

The use of a current to aid in the sintering of ceramic materials has been published in a large number of papers.

Electric pulse assisted consolidation (EPAC) includes all processes based on heating the material to be sintered with a pulsed DC current. Other names for this technique are spark plasma sintering (SPS), pulsed electric current sintering (PECS), field assisted sintering technique (FAST), plasma-assisted sintering (PAS) and plasma pressure compaction ($P^2C$). These techniques will hereafter be referred to as SPS.

SPS is a relatively new sintering technique, even though the idea to compact metallic materials by an electro-discharge process existed already in the 1960s (U.S. Pat. No. 3,241,956). Electrical energy pulses are applied to a powder which is placed in a die between conducting punches. The sintering method allows production of fully dense materials within minutes while applying high heating rates and short dwell times. A pulsed DC current with typical pulse durations of a few ms and currents of 0.5-30 kA flows through the punches, the die and, depending on the electrical properties of the specimen, also through the specimen. The electrical pulses are generated in the form of pulse packages where the on:off relation is in the region of 1:99 to 99:1. The pressure is directly applied on the punches in a uniaxial direction, and thereby on the powder bed, and is typically between 5 and 200 MPa. The technique is today used to compact a variety of different metallic and ceramic materials.

Using conventional sintering methods like hot pressing (HP), hot isostatic pressing (HIP) or pressure-less sintering, the densification of ceramic materials such as silicon nitride and sialon (silicon nitride based material where silicon and nitrogen are substituted with aluminium and oxygen) is accompanied by an uncontrolled growth of the crystalline grains. The normal sintering practice, both for conventional sintering methods and for SPS, is often to heat the powder to be sintered at a certain rate and thereafter holding it at a certain temperature and pressure until the maximum density is reached. The grain size is then increasing with the density. The uniaxial pressure leads to an anisotropic microstructure of the ceramics, as the grain growth is favoured perpendicularly to the pressure. The orientation and dimensions of the crystalline grains of the ceramics have a large impact on the mechanical properties of the components. A lot of effort has therefore been focused on attempts to tailor the grain sizes and microstructures of the ceramics in order to obtain desired mechanical properties of the resulting components.

It is known to use SPS for sintering ceramics with very fine grain structure. In U.S. Pat. No. 5,622,905 a sintered silicon nitride body is described having a uniform fine crystal size not exceeding 200 nm after sintering by spark plasma sintering, microwave sintering, ultra-high pressure sintering, or the like.

Several publications report on sintering of silicon nitride and sialons with SPS. In "Formation of in situ reinforced microstructures in alfa-sialon ceramics: Part III; Static and dynamic ripening", J. Mater. Res. Vol. 19, No 8, August 2004, pages 2402-2409, is described how (YB+Y)-stabilized alfa-sialon samples are consolidated by spark plasma sintering. It was found that below a temperature threshold consolidation of alfa-sialon could be achieved with very limited grain growth. A temperature threshold for grain growth is also observed and annealed consolidated samples were showing elongated alfa grains.

DESCRIPTION OF THE INVENTION

An object of the present invention is a method for tailoring the microstructure of sintered ceramic components.

Another object of the invention is to manufacture sintered ceramic components by a fast and energy efficient method.

Another object of the invention is to manufacture sintered ceramic components of silicon nitride and/or sialon, having excellent mechanical properties.

The objects of the invention are realised by sintering a ceramic powder or green body in a SPS apparatus in at least two steps. By separating densification from grain growth, it is possible to tailor the microstructure of the component. By performing an initial sintering step at a first temperature and a first pressure, followed by a controlled grain growth step at a second temperature, higher than the first temperature, and a second pressure, lower than the first pressure, new possibilities to improve the mechanical properties of ceramics through microstructure design are possible.

Different crystal structures are differently favoured by this procedure. The microstructural development in the two polymorphs, $\alpha$ and $\beta$, of silicon nitride and sialons is different in the way that the $\alpha$-phase generally consists of equi-axed grains while the $\beta$-phase has elongated, rod-like grains. These differences lead to variations in the mechanical properties of the materials, depending on the crystal structure. For example $\alpha$-$Si_3N_4$ possesses higher hardness than $\beta$-$Si_3N_4$, while the elongated structure of the $\beta$-grains promotes a higher toughness. The same is valid for $\alpha$- and $\beta$-sialons. In the case of both sialons and $Si_3N_4$, the $\beta$-structure is more favoured by this procedure than the $\alpha$-phase. The controlled growth of the rod-like $\beta$-grains gives a whisker-like structure, resulting in a reinforced material. The $\alpha$-grains can become elongated, but those grains are coarser than the $\beta$-grains and the improvement of the mechanical properties is therefore less pronounced.

The component manufactured in accordance with this invention shall have a $\beta$-$Si_3N_4$ or a $\beta$-Sialon content which is at least 50% by weight of the total weight.

The temperature, time and pressure used in the at least two steps are dependent on the composition of the material to be sintered as well as of the component size. Evaluation of proper conditions is made by taking out test samples in order to establish the optimum conditions for achieving a three-dimensional microstructure with elongated $\beta$-grains.

DETAILED DESCRIPTION OF THE INVENTION

Improved ceramic components can be obtained through a controlled grain growth in the SPS unit, where a whisker-like material can be formed by the controlled growth of the rod-like β-grains. In brief, a SPS process with an initial sintering step where densification occurs, followed by a controlled grain growth step through a combination of a change in both temperature as well as pressure, will result in a component with improved mechanical properties in three dimensions.

In the first step sintering is taking place at a first temperature and a first pressure until the material is fully or near fully dense. This step is interrupted when densification has stopped or slowed down considerably in order to prevent grain growth. In a second step, grain growth is favoured by the combination of a second pressure and a second temperature, where the second pressure is reduced in comparison with the first pressure and the second temperature is increased in comparison with the first temperature. The duration of this step is optimised for each material and component as well as batch size, in order to achieve the desired mechanical properties for the resulting component. The duration time thus needs to be analysed on pre-produced samples in order to see for how long this step should be performed. By reducing the pressure in the second step, anisotropy of the microstructure is reduced, by allowing grains to grow more isotropically. Tailored ceramic materials with reinforced structure can in this way be obtained, where grain growth in three dimensions leads to improved mechanical properties.

The invention applies mainly to materials based on silicon nitride and sialon, but can also be applied to other ceramic materials which can be sintered with SPS, such as tungsten carbide. Additives such as $Y_2O_3$ or other rare earth oxides, $Al_2O_3$, AlN, TiC, TiN, SiC and/or oxynitrides of silicon and aluminium can be included in the powders, at a total amount of maximum 10 wt %. Unavoidable impurities may be present in the materials.

Figure 1:
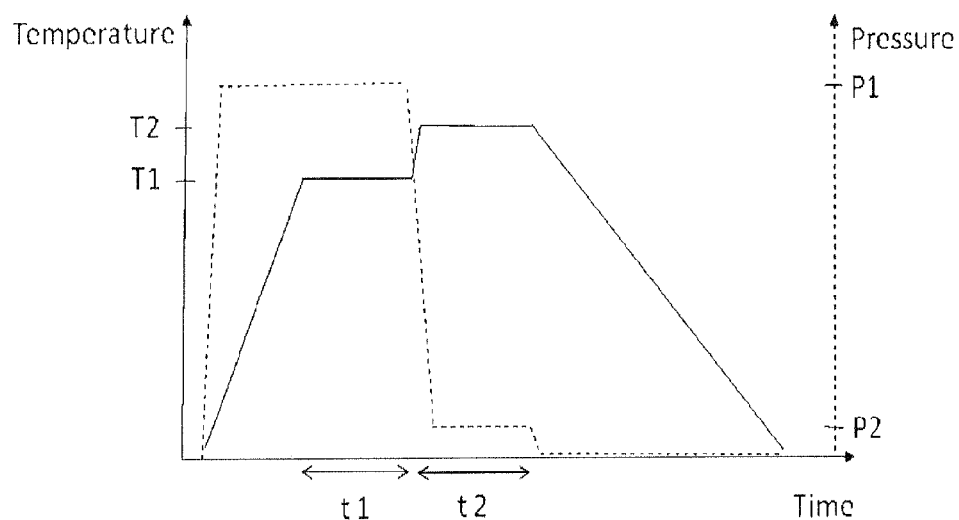
FIG. 1. Schematic diagram showing changes in temperature and pressure with time, illustrating the present invention.

A schematic structure of the sintering cycle is shown in FIG. 1. For sintering of silicon nitride and sialon based materials according to the present invention a heating rate applied is between 5 and 600° C. $min^{-1}$, preferably 50-150° C. $min^{-1}$. The first temperature of the first step, T1, is the temperature where full or almost full densification occurs, which for $Si_3N_4$ and sialon is between 1500 and 1600° C. The density is then at least 99% of the theoretical density, or at least 97%. The first pressure for this step, P1, is normally between 20 and 150 MPa, preferentially between 30-70 MPa. The duration for this step, t1, is between 1 and 60 minutes, typically between 3 and 20 minutes, depending on the parameters mentioned above. The temperature is thereafter increased to a second temperature, T2, which is typically 100 to 200° C. above T1, preferentially between 1600 and 1750° C. Simultaneously, the pressure is lowered to a second pressure, P2, in order to apply a low pressure, typically less than 5 MPa or less than 10 MPa, as the machine normally requires that some pressure is applied. The duration of the second step, t2, is between 1 and 60 minutes, typically between 3 and 20 minutes.

The sintering procedure includes high heating rates (steep heating ramps) and a short holding time at the desired temperatures.

Figure 2:
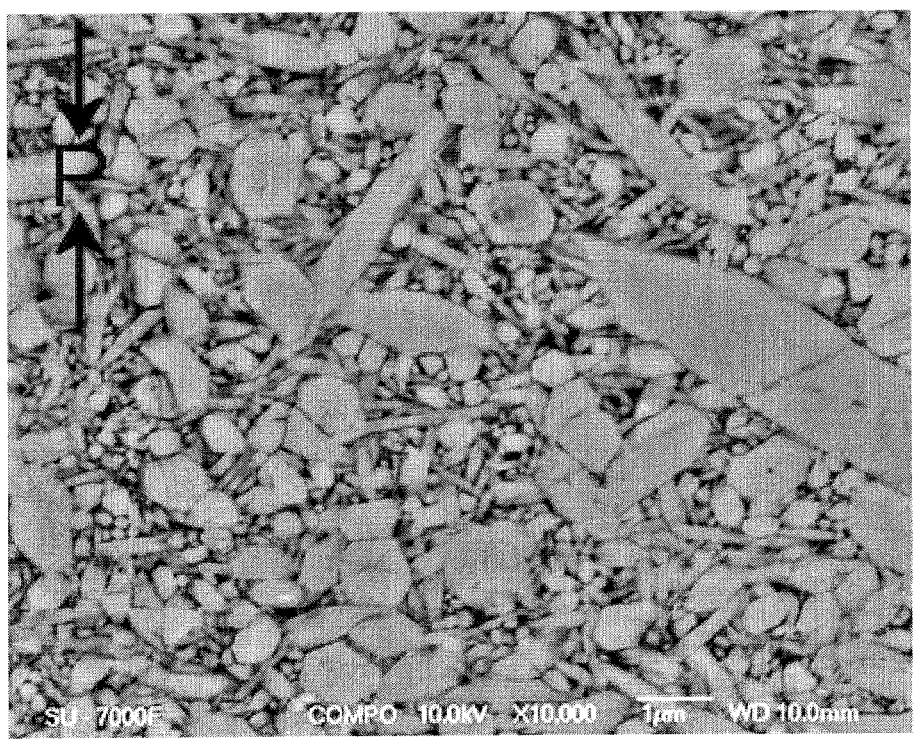
FIG. 2. Scanning electron micrograph showing the grains of a sample prepared according to Example 1, with arrows indicating the direction of the pressure applied.

In FIG. 2 is shown the microstructure of a sialon material produced according to the present invention, showing an isotropic distribution of the elongated β-grains. The direction of the pressure P1 in the first step is shown by the arrow in the figure. The second step having a lower pressure P2 allows for β-grains to grow in many directions.

It is through this process possible to form a dense material with a tailored microstructure, within one hour, or more typically within 30 minutes. The cooling down of the sample can either be programmed or the sample will cool down automatically as the current is switched off.

The materials produced through the method of this invention can be used in a full range of applications where high performing ceramic components are needed, such as all ceramic or hybrid bearings, cutting tools and engine components.

EXAMPLES

Example 1

A powder was produced through mixing of 91 wt % $Si_3N_4$ ($d_{50}$<0.5 μm), 5 wt % $Y_2O_3$ ($d_{50}$<0.9 μm) and 4 wt % $SiAl_6O_2N_6$ ($d_{50}$<2.50 μm). The powder was mixed in a liquid medium and freeze dried. The powder was inserted into a graphite die chamber of an SPS unit and the chamber was closed by two punches. The temperature was initially automatically raised to 600° C. Subsequently, a heating rate of 100° C. $min^{-1}$ was applied. The sample was densified at a first temperature of 1550° C. for three minutes and thereafter treated at a second temperature of 1700° C. for four minutes. The temperature was measured with an optical pyrometer focused on the surfaces of the sintering die. The sintering took place under vacuum. The first pressure was kept at 50 MPa for the first step and was lowered to a second pressure of 5 MPa at the second step. A ceramic component was formed with a Vicker's hardness, $HV_{10}$, about 1800 kg $mm^{-2}$ and a fracture toughness, $K_{1c}$, of 6.4-6.8 MPa·$m^{1/2}$. The sintered material consists of a mixture of 80 wt % β-sialon and 20 wt % α-sialon, measured through X-ray powder diffraction. The β-grains have an average aspect ratio of approximately 1.2× 0.3 μm.

Example 2

Sialon samples were prepared according to the composition and powder preparation of Example 1. The samples were sintered in one or two steps, respectively, according to the table below. The change in aspect ratio of the grains is clear when a second step is performed at a high temperature. It is mainly the length of the grains that is increasing, while the width shows a minor increase. Further, the aspect ratio of the grains affects the mechanical properties. Sample no 5, sintered in two steps, shows optimised properties.

| Sample no. | Temp. 1/ Temp. 2 (° C.) | Time1/ Time2 (min) | P1/P2 (MPa) | Density (g $cm^{-3}$) | $K_{1C}$ (MPa· $m^{1/2}$) | Stdv (±) | $Hv_{10}$ (GPa) | Stdv (±) | Length, x (μm) | Stdv (±) | Width, y (μm) | Stdv (±) |
|---|---|---|---|---|---|---|---|---|---|---|---|---|
| 1 | 1650 single step | 5 | 50 | 3.23 | 6.2 | 0.5 | 20 | 0.4 | 0.7 | 0.26 | 0.28 | 0.1 |
| 2 | 1700 single step | 5 | 50 | 3.23 | 5.7 | 0.4 | 19.6 | 0.5 | 0.84 | 0.65 | 0.32 | 0.21 |
| 3 | 1750 single step | 5 | 50 | 3.22 | 5.8 | 0.4 | 19.6 | 1.4 | 1.04 | 0.54 | 0.4 | 0.24 |

-continued

| Sample no. | Temp. 1/ Temp. 2 (° C.) | Time1/ Time2 (min) | P1/P2 (MPa) | Density (g cm$^{-3}$) | K$_{1C}$ (MPa·m$^{1/2}$) | Stdv (±) | Hv$_{10}$ (GPa) | Stdv (±) | Length, x (µm) | Stdv (±) | Width, y (µm) | Stdv (±) |
|---|---|---|---|---|---|---|---|---|---|---|---|---|
| 4 | 1550/1650 | 3/5 | 50/5 | 3.23 | 5.0 | 0.4 | 19.3 | 1.8 | 0.44 | 0.17 | 0.25 | 0.09 |
| 5 | 1550/1700 | 3/5 | 50/5 | 3.24 | 7.2 | 1.2 | 20.9 | 1.4 | 1.22 | 0.69 | 0.31 | 0.17 |
| 6 | 1550/1750 | 3/5 | 50/5 | 3.24 | 5.5 | 0.3 | 19.1 | 0.3 | 1.3 | 0.88 | 0.35 | 0.26 |

Example 3

As a comparison to Example 1, another sample with the same powder composition and component dimensions was sintered in the SPS-unit. The sintering conditions were the same except for in the grain growth step, where this latter sample was subjected to a second pressure of 50 MPa instead of the low second pressure of 5 MPa typical for this invention. The sintering conditions and results from indentation measurements are shown in the table below. The Vicker's hardness, Hv$_{10}$, is high for both samples, but slightly higher for Example 1. The largest difference is however for the fracture toughness, K$_{1C}$, where the low pressure of the grain growth step for Example 1 has lead to a much higher toughness compared to when a high second pressure was applied. Also the fracture indentation toughness in the case of example 1 was homogeneous throughout the sample, while example 2 showed clear variations from sample edges to core.

| Sample | T1/T2 (° C.) | t1/t2 (min) | P1/P2 (MPa) | Hv$_{10}$ (kg mm$^{-2}$) | K$_{1C}$ (MPa·m$^{1/2}$) |
|---|---|---|---|---|---|
| Example 1 | 1550/1725 | 4/3 | 50/5 | 1800 | 6.4-6.8 |
| Example 2 | 1550/1725 | 4/3 | 50/50 | 1740 | 4.3-6.1 |

The invention claimed is:

1. A method for manufacturing ceramic components comprising silicon nitride or sialon or mixtures thereof, with a tailored microstructure by a spark plasma sintering (SPS) procedure in an SPS unit, wherein a powder or pre-formed green body in the SPS unit is treated in a first densification step at a first temperature and a first pressure in order to densify the powder or green body, whereafter the temperature is increased and the pressure is decreased such that the material in the SPS unit is treated in a second grain growth step following the first step at a second temperature which is higher than the first temperature and a second pressure that is lower than the first pressure in order to promote anisotropic grain growth of whisker-like β-silicon nitride and/or β-sialon grains in the component, wherein a holding time of the first densification step is long enough to obtain a density of not less than 97 percent of the theoretical density.

2. The method of claim 1, wherein the powder or preformed green body additionally comprises rare earth oxides, aluminium nitride, aluminium oxide and/or oxynitrides of silicon aluminium.

3. The method of claim 1, wherein the powder or green body is treated in the first step at a first pressure, a uniaxial pressure between 20 and 150 MPa, a heating rate of 5 to 600 degrees Celsius per minute and a first temperature between 1400 and 1600 degrees Celsius and that the second temperature of the following grain growth step is between 1600 and 1800 degrees Celsius and the second pressure is below 10 MPa.

4. The method of claim 3, wherein the holding time of the of the following grain growth step is between 1 and 60 minutes.

5. The method of claim 4, wherein the holding time of the following grain growth step is between 3 and 20 minutes.

6. The method of claim 3, wherein the uniaxial pressure is between 30 and 70 MPa.

7. The method of claim 3, wherein the first temperature is between 1450 and 1600 degrees Celsius.

8. The method of claim 3, wherein the second pressure is below 5 MPa.

9. The method of claim 1, wherein a holding time of the first densification step is long enough to obtain a density of or not less than 99 percent of the theoretic density.

10. The method of claim 9, wherein the holding time of the first densification step is between 1 and 60 minutes.

11. The method of claim 10, wherein the holding time of the first densification step is between 3 and 20 minutes.

12. The method of claim 9 wherein the second temperature of the following grain growth step is between 1650 and 1750 degrees Celsius.

13. The method of claim 1, wherein the whisker-like grains have a width and a length, the length being at least about 1.76 times longer than the width.

* * * * *